J. SCHEER.
BAKE OVEN.
APPLICATION FILED FEB. 28, 1916.
1,199,929.
Patented Oct. 3, 1916.
3 SHEETS—SHEET 1.
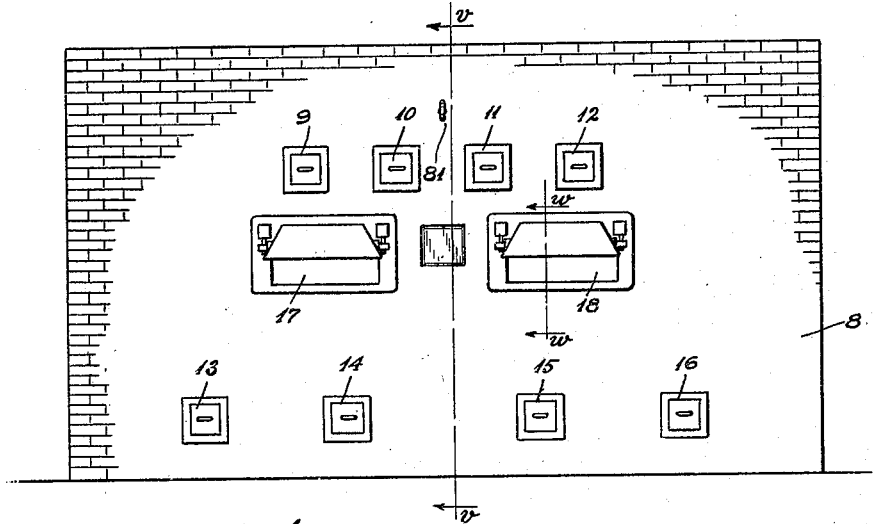
FIG. 1
FIG. 2
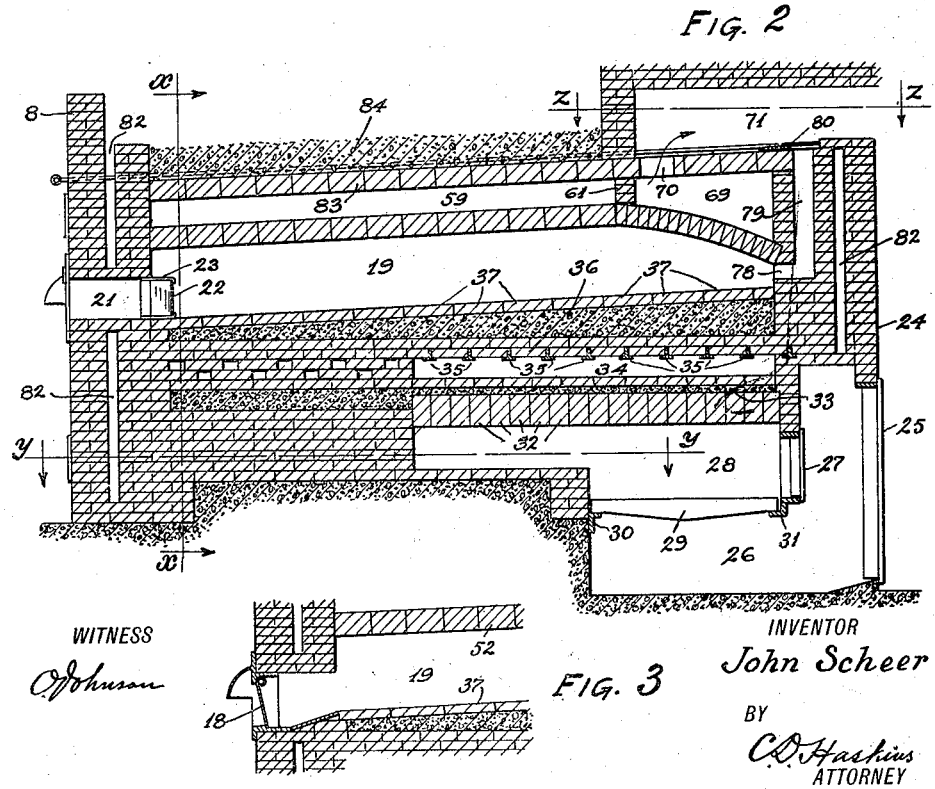
FIG. 3
WITNESS
INVENTOR
John Scheer
BY
ATTORNEY

J. SCHEER.
BAKE OVEN.
APPLICATION FILED FEB. 28, 1916.

1,199,929.

Patented Oct. 3, 1916.
3 SHEETS—SHEET 2.

WITNESS
O. Johnson

INVENTOR
John Scheer
BY
C. D. Haskins
ATTORNEY

J. SCHEER.
BAKE OVEN.
APPLICATION FILED FEB. 28, 1916.

1,199,929.

Patented Oct. 3, 1916.
3 SHEETS—SHEET 3.

WITNESS
O. Johnson

INVENTOR
John Scheer
BY
C. D. Haskins
ATTORNEY

UNITED STATES PATENT OFFICE.

JOHN SCHEER, OF SEATTLE, WASHINGTON.

BAKE-OVEN.

1,199,929.   Specification of Letters Patent.   Patented Oct. 3, 1916.

Application filed February 28, 1916. Serial No. 81,041.

*To all whom it may concern:*

Be it known that I, JOHN SCHEER, a subject of the Emperor of Austria-Hungary, residing at Seattle, in the county of King and State of Washington, have invented a certain new and useful Improvement in Bake-Ovens, of which the following is a specification.

My invention relates to improvements in bake ovens of that class which is employed by bakers in the operation of baking bread and pastry, and the object of my invention is to provide an oven that shall be so constructed that in its operation the space within its front end portion shall be heated to a higher temperature than will be the space within its rear end portion, whereby those loaves of bread or pastry which are first put into said bake oven and which are the last to be taken therefrom will be disposed in the less heated rear portion thereof while loaves which are last put therein and which are the first to be taken therefrom will occupy the more highly heated front portion thereof.

A further object of my invention is to provide such an oven which shall be so constructed that those portions of its brick-work which are subjected to a direct contact with the flame of a fire within its furnace may be removed and new brick-work be substituted therefor without disturbing the floor and walls of its baking chamber.

I accomplish these objects by devices illustrated in the accompanying drawings wherein—

Figure 4:
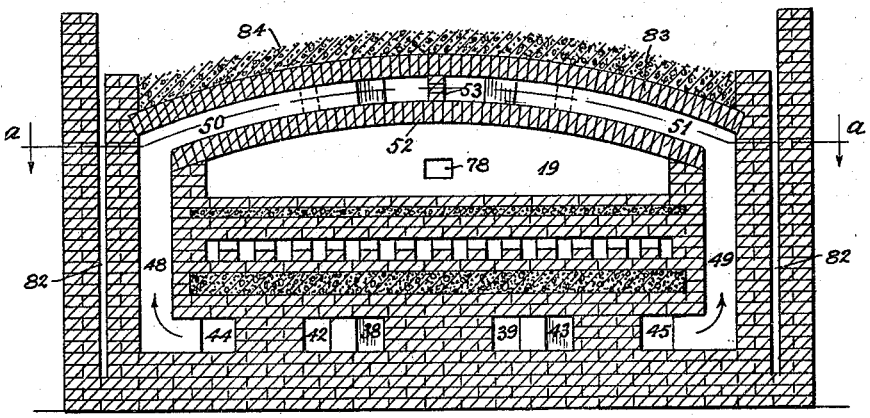
Figure 5:
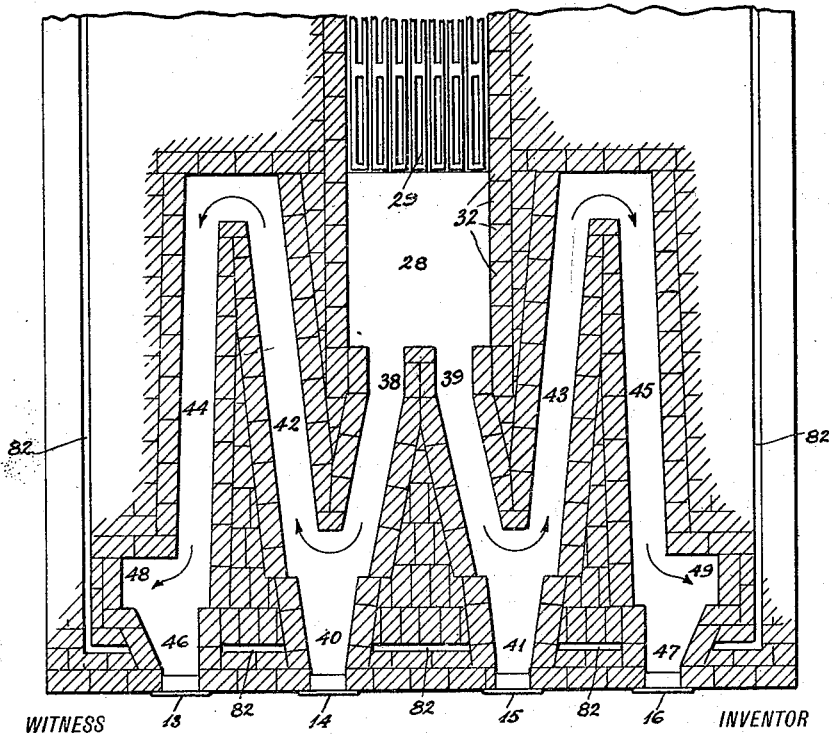
Figure 6:
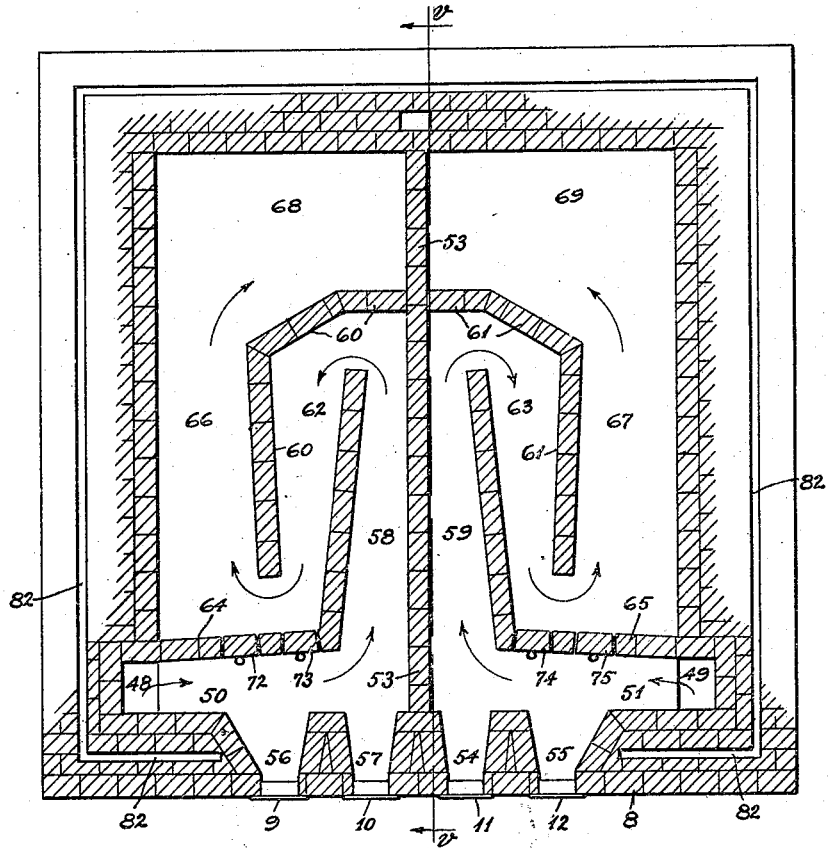
Figure 7:
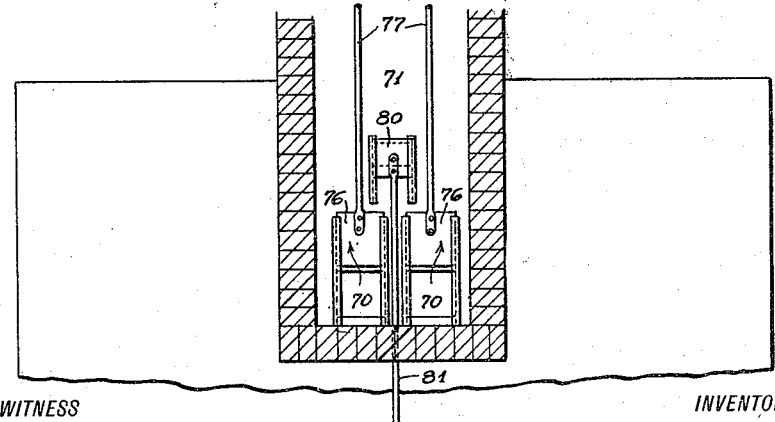

Figure 1 is a view in front elevational view of an oven embodying my invention; Fig. 2 is a fragmentary view of the same in vertical section on broken lines $v, v$ of Figs. 1 and 6; Fig. 3 is a fragmentary view of the same on broken line $w, w$ of Fig. 1; Fig. 4 is a fragmentary view of the same in vertical cross-section on broken line $x, x$ of Fig. 2; Fig. 5 is a fragmentary view of the same in horizontal section on broken line $y, y$ of Fig. 2; Fig. 6 is a view of the same on broken line $a, a$ of Fig. 4; and Fig. 7 is a fragmentary view of the same in horizontal section on broken line $z, z$ of Fig. 2.

Referring to the drawings, throughout which like reference numerals indicate like parts, 8 designates the front brick wall of one form of an oven embodying my invention, which wall 8 is provided with a plurality of openings which lead into certain flues, which openings are closed by removable sheet metal stoppers 9, 10, 11, 12, 13, 14, 15 and 16 and which is further provided with two doors 17 and 18 of well known form which open directly into a baking chamber. Between the doors 17 and 18 is a smaller doorway which opens into an opening 21 which extends through said wall into said baking chamber 19 and the inner end of said opening 21 is closed by a mica window 22 that is fixed in a sheet metal frame 23, within which frame 23 may be disposed an electric lamp (not shown) which may serve to illuminate the baking chamber 19.

In the lower portion of the rear wall 24 of the structure is a removable door 25 which may be opened to gain access to an ash pit 26 and a door 27 which opens into the fire box 28 which is provided with grate bars 29 through which ashes may fall into the ash pit 26, said grate bars 29 being supported by cross bars 30 and 31 of angle iron, as more clearly shown in Fig. 2.

The side wall and the top wall of the fire box 28 are made of fire-brick, as bricks 32, and disposed on top of the layer of bricks 32 of said top wall is a layer of concrete 33 upon the top of which is a layer of common brick which constitutes the floor of a narrow empty space 34 and the top wall of said empty space is made of two layers of common bricks which are supported by iron cross bars 35 of inverted T shape in cross-section and on the top of said two layers of brick is disposed a layer of concrete 36 which is covered by a layer of bricks, as bricks 37, which serve to form the floor of the baking chamber 19, as shown in Fig. 2. The iron cross-bars 35 are employed for supporting that portion of the masonry work immediately above the narrow empty space 34 in order that the walls of the fire box 28 may be renewed from time to time, as required, without disturbing any other portions of the structure and such cross-bars 35 so disposed form an important feature of my invention.

Referring now to Fig. 5, which is a sectional fragmentary view of my bake oven on a horizontal plane indicated by broken line $y, y$ of Fig. 2, leading from the fire box 28 are two flues 38 and 39 which extend in diverging directions to openings 40 and 41, respectively, through the front wall of the structure, which openings are closed by stoppers 14 and 15 respectively, and extending rearwardly from said openings 40 and 41 in diverging directions to a line registering with the inner ends of the grate bars 29 are connecting flues 42 and 43, respectively, which connect, at their rearward ends, with flues 44 and 45 which extend forwardly to openings 46 and 47, respectively, which openings 46 and 47 are closed respectively by the stoppers 13 and 16. The flues 44, 42, 38, 39, 43 and 45 may be scraped and thoroughly cleaned by suitable tools upon removing the stoppers 13, 14, 15 and 16 which close the openings 46, 40, 41 and 47 respectively.

From the front end portions of the flues 44 and 45, adjacent to the openings 46 and 47 respectively, are connecting flues 48 and 49, respectively, which extend vertically upward, as shown more clearly in Fig. 4, to connect with flues 50 and 51, respectively, which extend toward each other over the arched roof 52 of the baking chamber 19 to a division wall 53 that extends to the rear wall of the structure, as more clearly shown in Fig. 6. Leading into said flue 51 through the front wall 8 are two openings 54 and 55 which are closed by stoppers 11 and 12, respectively, and leading into the flue 50 through said front wall 8 are openings 56 and 57 which are closed by stoppers 9 and 10, respectively.

Extending rearwardly from the flues 50 and 51, and adjacent to partition walls 60 and 61, respectively, are flues 58 and 59, respectively, which connect with flues 62 and 63, respectively, which extend forwardly to the rear sides of the rear walls 64 and 65 of the passageways 50 and 51, respectively. The flues 62 and 63 are formed by forward extensions of the partition walls 60 and 61 and rearward extensions of the walls 64 and 65, respectively. The flues 62 and 63 at their forward ends lead into wider flues 66 and 67, respectively, which extend rearwardly into still wider spaces 68 and 69, respectively, and extending upwardly through the top wall of each of said spaces 68 and 69 at points adjacent to the partition walls 60 and 61, respectively, are passageways 70, shown in Figs. 2 and 7, which passageways both lead into a flue 71 which extends into a chimney, not shown. Thus smoke and hot gases may find passageway to a chimney in a zigzag course through flues 38, 42, 44, 48, 50, 58, 62 and 66, thence through the space 68 and a passageway, corresponding to the passageway 70, to the passageway 71, and also through a zigzag course through passageways 39, 43, 45, 49, 51, 59, 63 and 67 into the space 69, thence through its passageway 70 and through the flue 71.

By removing the stoppers 9, 10, 11 and 12 which close the openings 56, 57, 54 and 55, respectively, the flues 50, 58, 51 and 59 may be cleaned; and the flues 66, 62, 63 and 67 may be cleaned by withdrawing removable bricks 72 and 73 which are disposed in the partition wall 64 at points opposite the opening 56, and withdrawing removable bricks 74 and 75 which are disposed in the partition wall 65 at points opposite the opening 55.

As shown in Fig. 7, the passageways 70, which lead into the flue 71, may be regulated by dampers, as dampers 76, to which are connected damper rods 77, which may extend rearwardly to project through the rear wall of the structure where they may be manipulated by a fireman as required.

Extending through the rear wall of the baking chamber 19 is a ventilating opening 78 which leads into a vertical ventilating flue 79 which connects with the flue 71 and the top end of said flue 79 is provided with a damper 80, as shown more clearly in Fig. 7, to which damper 80 is connected a damper rod 81 which extends forwardly to and through the front wall 8 of the structure where it may be manipulated at times required to permit hot air to escape from the baking chamber 19.

Within the vertical four side walls of the structure are formed narrow vertical spaces 82 which may serve as insulators of heat to confine heat within the structure.

While I have shown such spaces 82 as being empty, it may be preferable, to fill such spaces with some none-heat-conducting material, as felt, asbestos fiber or the like.

The arched roof covering the passageways 50, 51, 58, 59, 62, 63, 66 and 67 comprising a layer of brick 83 is covered with a layer of concrete 84 which may be of any desired depth.

My bake oven when constructed in accordance with the principles disclosed by the foregoing description and the accompanying drawings will, in its operation, cause the front end portion of the baking chamber 19 to be heated to a higher degree than will be the rear portion thereof whereby loaves of bread or pastry which are first introduced and disposed in the rear portion of said baking chamber 19 and which are the last to be withdrawn therefrom will be subjected for a longer time to a lower temperature while such bread or pastry which is last introduced therein to be disposed in the front portion thereof and which are the first to be withdrawn therefrom will be subjected to a higher temperature for a shorter length of time with the result that all of such bread or pastry will be evenly cooked to the same degree.

Obviously, changes may be made in the form of construction, in the dimensions and in the arrangement of parts of my invention without departing from the spirit thereof.

What I claim is:

1. A bake oven of the class described, which embodies a structure whose vertical side walls of masonry are provided with hollow spaces adapted to contain heat insulating material; an ash pit disposed in the lower portion of the rearward end portion of said structure adjacent to its rear wall; a doorway disposed in said rear wall through which one may gain access to said ash pit; a fire-box provided with grate bars disposed above said ash pit; a fire-brick roof disposed to cover said fire-box; a baking chamber whose floor is a portion of the top surface of said body of masonry and whose side walls and roof are formed by integral masonry transversely disposed iron cross bars disposed above said fire-brick roof and supporting a portion of the baking chamber floor; a door disposed in the front wall of said baking chamber; two flues disposed in integral masonry to diverge from said fire-box to points within the front end portion of said structure, thence rearwardly in the same horizontal planes, thence again forwardly to said front end portion in the same planes, thence vertically upward to points higher than said baking chamber, thence toward each other to a partition wall, thence rearwardly above said baking chamber, thence divergingly forward in the same planes, thence rearwardly to spaces adjacent to the rear wall of said structure; a flue disposed above said spaces and adapted to be connected with a chimney; and a damper controlled passageway disposed to extend from each of said spaces into said chimney flue.

2. A bake oven of the class described, which embodies a brick structure containing a baking chamber; a door opening into said baking chamber through the front wall thereof, transversely disposed iron bars disposed to support a portion of the bottom wall of said baking chamber; a fire-box having a roof of fire-brick and disposed beneath said iron bars whereby the masonry of said fire-box may be reconstructed without disturbing integral masonry; a doorway disposed in the rearward wall of said structure through which doorway one may gain access to said fire-box; a damper-controlled chimney flue disposed in the upper portion of said structure; two flues disposed in integral masonry to diverge from said fire-box to points within the front end portion of said structure, thence rearwardly in the same horizontal planes, thence again forwardly to said front end portion in the same planes, thence vertically upward to points higher than said baking chamber, thence toward each other to a partition wall, thence rearwardly above said baking chamber, thence divergingly forward in the same planes, thence rearwardly to spaces adjacent to the rear wall of said structure.

3. A bake oven of the class described, which embodies a brick structure containing a baking chamber; transversely disposed iron bars disposed to support a portion of the bottom wall of said baking chamber; a fire-box having a roof of fire-brick disposed beneath said iron bars; a damper-controlled chimney flue disposed in the upper portion of said structure; two flues disposed in integral masonry to diverge from said fire-box to points within the front end portion of said structure, thence rearwardly in the same horizontal planes, thence again forwardly to said front end portion in the same planes, thence vertically upward to points higher than said baking chamber, thence toward each other to a partition wall, thence rearwardly above said baking chamber, thence divergingly forward in the same planes, thence rearwardly to spaces adjacent to the rear wall of said structure; and stopper-controlled openings extending through a wall of said structure into said flues through which soot may be withdrawn from said flues.

In witness whereof, I hereunto subscribe my name this 10th day of February, A. D. 1916.

JOHN SCHEER.

Witnesses:
FRANK WARREN,
O. JOHNSON.